March 6, 1951
A. G. BODINE, JR
2,543,758
STANDING WAVE HEAT ENGINE WITH MEANS
FOR SUPPLYING AUXILIARY AIR
Filed June 13, 1947
3 Sheets-Sheet 1
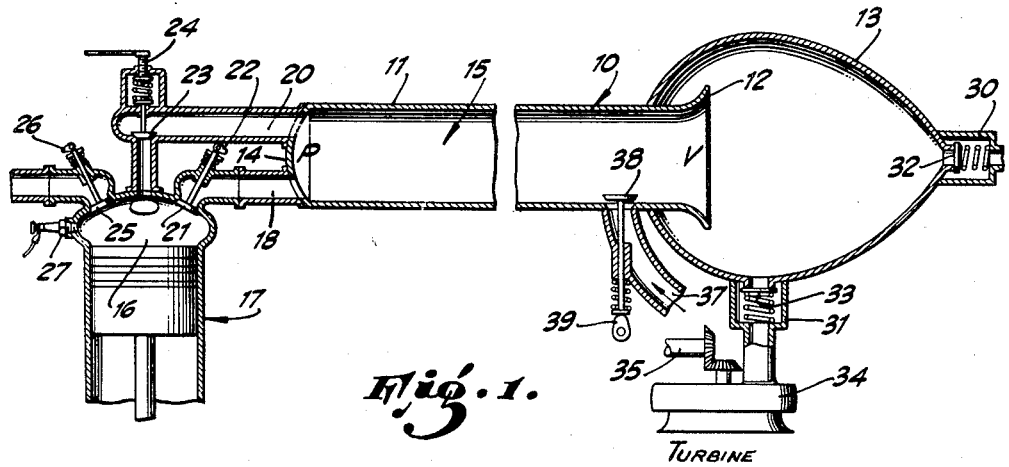
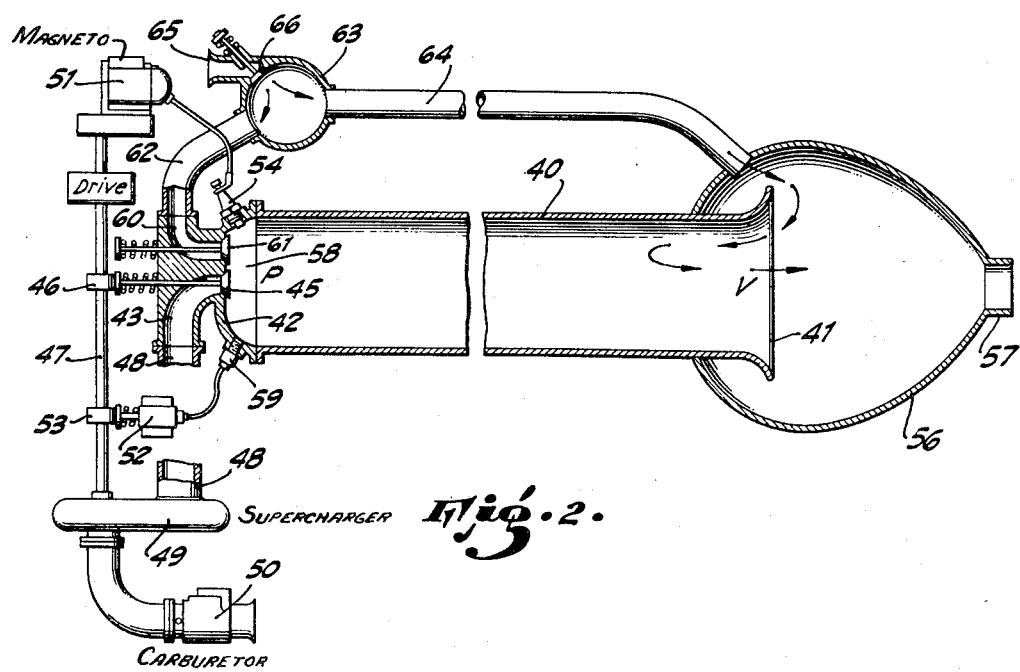
Inventor
Albert G. Bodine, Jr.,
By
Forrest J. Lilly
Attorney March 6, 1951

A. G. BODINE, JR 2,543,758

STANDING WAVE HEAT ENGINE WITH MEANS
FOR SUPPLYING AUXILIARY AIR

Filed June 13, 1947

Inventor
Albert G. Bodine, Jr.,
By
Ferrill Filley
Attorney

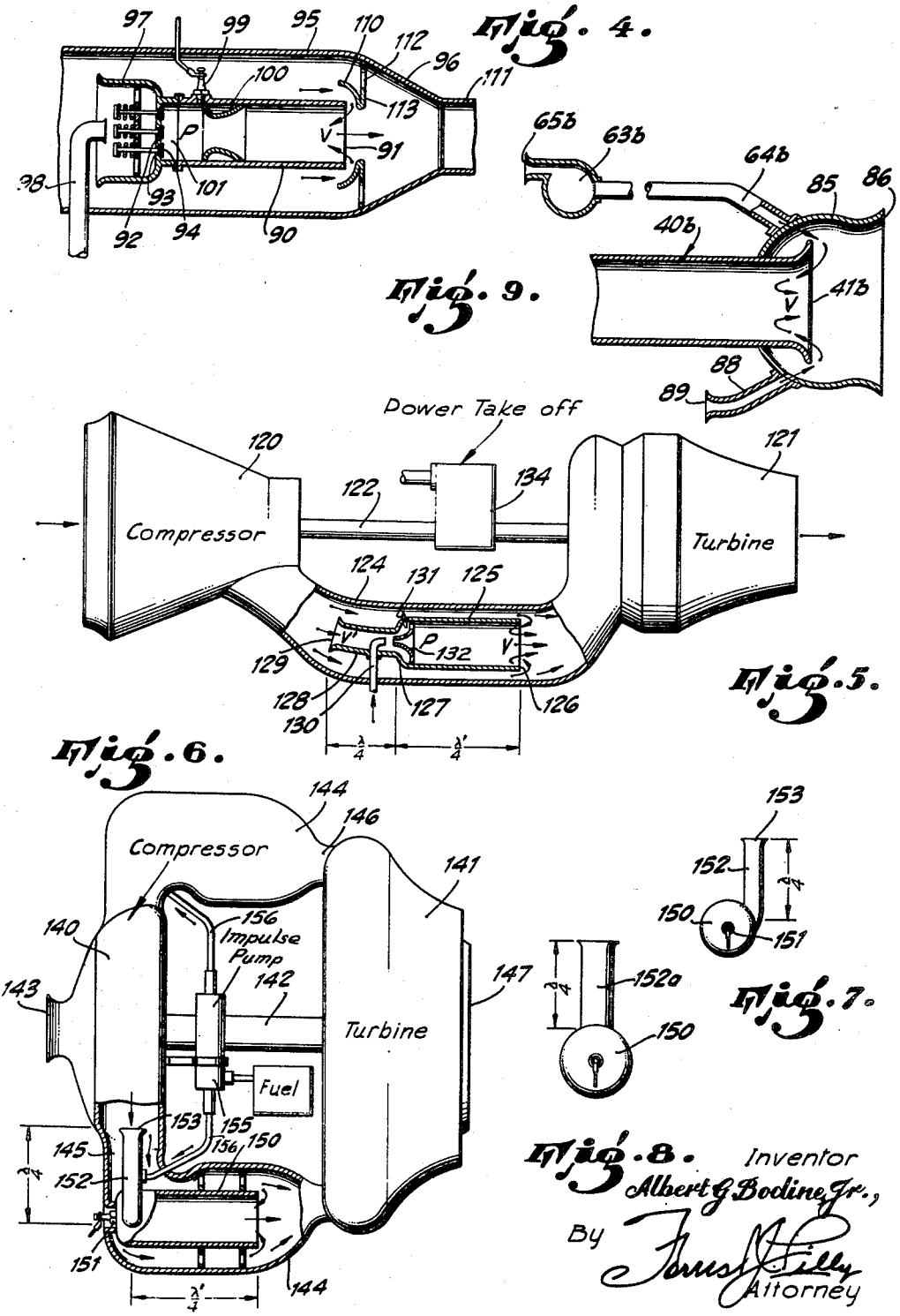

Patented Mar. 6, 1951

2,543,758

UNITED STATES PATENT OFFICE 2,543,758

STANDING WAVE HEAT ENGINE WITH MEANS FOR SUPPLYING AUXILIARY AIR

Albert G. Bodine, Jr., Van Nuys, Calif.

Application June 13, 1947, Serial No. 754,559

17 Claims. (Cl. 60—35.6)

This invention relates generally to combustion apparatus, and more particularly to thermal jet engines of the acoustic standing wave type, as is disclosed in my copending patent application Serial No. 439,926, filed April 21, 1942 (now abandoned), entitled Method and Apparatus for Generating a Controlled Thrust, and of which the present application is a continuation-in-part. See also my Patent No. 2,480,626, issued August 30, 1949. Engines of this type have such diverse applications as jet propulsion wherein their thrust producing characteristics are of primary importance, and as blowers or compressors utilized, for example, to supply heated air under pressure to a gas turbine, or to supply a large volume of warmed air for space heating.

In its gas turbine application, used between the usual compressor and the turbine, the present invention serves several advantageous purposes, including increase in the expansion ratio of the turbine, reduction of the temperature of the heated gases to values which the turbine blades can withstand, and as a "topping" unit, designed to extract heat energy from the combustion heated gases and convert it into mechanical or kinetic energy of gas flow through the system.

In accordance with the present invention, there is utilized, in most applications, a resonated tubing or cavity having a closed end and an open end, the former being the location of a pressure anti-node, and the latter being the location of a velocity anti-node. In the special case of a straight tubing closed at one end and open at the other, its length will be substantially one-quarter the length of the wave corresponding to its resonant frequency. Thermal drive means in the form of means for intermittent fuel combustion at a resonant frequency of the tubing is provided and either discharges to or is located at the pressure anti-node. Primary air necessary for the initial combustion is supplied, sometimes under pressure, to the combustion region.

In such an engine, each combustion launches a wave of compression traveling with the speed of sound down the column of fluid within the resonant tubing. By reason of alternate inverse and like-kind reflection at the open and closed ends of the tubing, a negative pressure peak is created at the combustion zone one-half cycle following each explosion, and a positive pressure peak is created at said zone a full cycle following each explosion. Assuming the fuel supply and ignition means to be timed to set off an explosion once each cycle, this positive pressure peak appearing once each cycle at the combustion zone coincides with and reinforces the periodic explosion. In some embodiments, it also compresses the fuel charge prior to combustion, and the described negative pressure wave may be utilized to draw fuel and/or air into the combustion zone.

By the means described in the preceding paragraph, a standing wave is established in the tubing with the aforesaid pressure anti-node at the combustion zone and velocity anti-node at the open end. In result, there is a "direct current" flow of combustion gases down the tubing to discharge from its open end, upon which is imposed an "alternating current" flow due to the standing wave. At the pressure anti-node region, this "alternating current" flow is, of course, substantially zero; but at the velocity anti-node, the to-and-fro or alternating current component may be very substantial, usually much greater than the direct current component. The alternating current component results in air being sucked into the open or velocity anti-node end of the tubing from virtually all directions during the half-cycle of inward flow (up the tubing), which air flow supplies secondary air to complete combustion and any excess or auxiliary air is jetted straight rearwardly from the tubing along with products of combustion during the half-cycles of outward flow (down the tubing). Depending upon the particular application in hand, this air so taken in at the velocity anti-node region of the apparatus can, if supplied in the proper way and in sufficient quantity, serve several very beneficial purposes, as will appear hereinafter.

It can be seen that the present invention is most conveniently practiced by using the class of resonant cavity having an open end. It is possible however to use other shapes of acoustic resonators provided there is or can be access for fluid introduction to their velocity anti-node regions.

With this introduction it may now be stated that a general object of the invention is to provide a thermal jet engine of the class described having provision for supplying or augmenting a flow of auxiliary fluid, usually secondary air, to the velocity anti-node region thereof.

It is believed that the various beneficial functions fulfilled by the invention can best be set forth in connection with the disclosure of various illustrative types of apparatus incorporating the invention. Reference for this purpose is made to the accompanying drawings in which:

Figure 1 is a longitudinal sectional view of one illustrative embodiment of the invention;

Figure 2 is a view similar to Figure 1 showing a modification;

Figure 4 is a longitudinal sectional view showing an adaptation of the invention to such industrial use as space heating;

Figure 5 is an elevational view, partly in longitudinal section, showing a compressor-turbine combination embodying the present invention;

Figure 6 is a side elevation, partly broken away, showing a modified compressor-turbine combination embodying the present invention;

Figure 7 is a detail view showing an end elevation of a resonant conduit of the embodiment of Figure 6;

Figure 8 shows a modification of Figure 7;

Figure 9 shows a modification of the embodiment of Figure 3;

Figure 3:
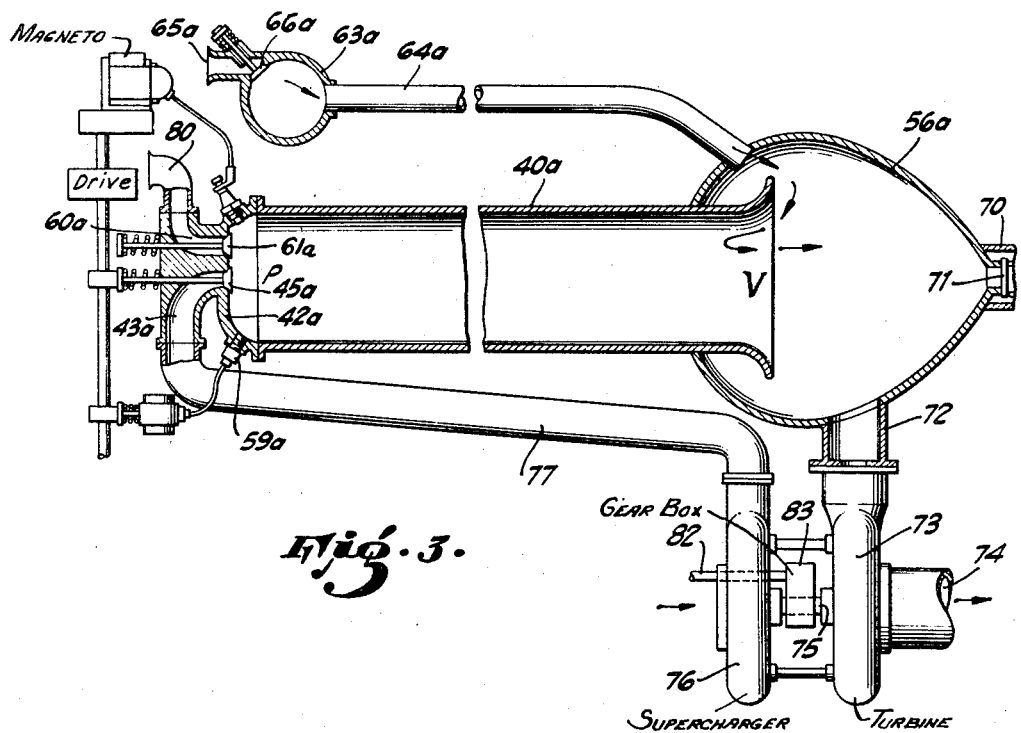
Figure 3 is a view similar to Figure 1 showing a still further modification.

In Figure 1 is shown an exemplification of what I may refer to as an "enclosed" system, namely, one in which the resonant tubing has its open end discharging into an enlarged housing, or "capacitance chamber." The system of Figure 1 may be used for propulsion, or, by mounting it on a stationary foundation, it may become a blower or compressor, useful for many purposes, and shown in this instance as driving a gas turbine, whose power may be utilized in any way desired. The turbine might, for instance, be used to drive a conventional supercharger (not illustrated) which furnishes the explosive mixture to the combustion chamber.

Numeral 10 in Figure 1 designates the housing of the enclosed sonic system in its entirety, made up of resonant tubing 11 whose flared open end 12 discharges gases into enlarged chamber 13 and also functions as a sonic wave expander. The tubing 11, which has a closed end or head 14, defines a sonic fluid column 15. Pressure pulses from a combustion chamber 16 of an internal combustion engine 17 are applied directly to the fluid column 15 by two illustrative means which may be used alternatively or together. The first comprises an exhaust passage 18 conducting the exhaust gases from the combustion 16 to the fluid column 15, and the second comprises an auxiliary exhaust passage 20 conducting a portion of the exhaust gases to the fluid column. The flow of exhaust gases through the former is controlled by a conventional exhaust valve 21 operated by an engine driven cam 22, and the latter includes an adjustable spring-loaded valve 23, the compression of which is adjustable by turning a screw 24. Admission of a fuel-air mixture to the combustion chamber is by way of a conventional intake valve 25 operated by an engine driven cam 26, the fuel being ignited by a spark plug 27. It will be clear that this intake and explosion system will be modified in the case of Diesel or injection type engines in accordance with known practice.

The enlarged housing or capacitive chamber 13 is provided, in this instance, with two outlets 30 and 31, the former of which leads straight rearwardly from chamber 13, that is, axially with respect to tubing 11, and the latter of which is here shown as discharging laterally from chamber 13. While not in all cases necessary, these outlets 30 and 31 are here shown as provided with spring-loaded valves 32 and 33, respectively, which are adapted to hold a certain back pressure within the system. Outlet 30 may discharge exhaust gases in a rearwardly direction for jet propulsion purposes, or may be coupled to any conduit or system requiring a supply of heated gases under pressure. Outlet 31 is shown as coupled into a gas turbine 34, which is shown as arranged to drive a shaft 35 transmitting power available for any useful purpose, such as driving the engine supercharger, etc.

The operation of the system results in the establishment of a velocity anti-node V at the open end 12 of the tubing 11, and a pressure anti-node P at the closed end thereof. The present invention provides a conduit means arranged for introducing additional fluid, preferably and usually air, to the velocity anti-node region V of tubing 11. In Figure 1, this means comprises the air pipe 37, fed by any suitable source of supply, and controlled by a poppet valve 38, which is in turn operated by an engine driven cam 39. It is to be understood that the timing of cam 39 is such that valve 38 will be opened for introduction of fluid to zone V during the half-cycle of operation wherein fluid in the velocity antinode region V is in motion "up" to the tubing 11, that is, toward the left in Figure 1.

The system of Figure 1 may be operated on several cycles, but the following typical cycle will be sufficiently illustrative for present purposes. It will be assumed, first that only the exhaust passage 18 is to be used, the alternate passage 20 being either omitted, or valve 23 held closed. During the expansion stroke of engine 17 (which may be assumed to be a four cycle engine), the valve 21 opens to permit discharge of exhaust gases to the head end of tubing 11, thus delivering a pressure pulse to the head end of the fluid column 15. A wave of compression travelling with the speed of sound is hence launched down the fluid column, to be discharged or expanded into the enlarged capacitance chamber 13. Because of the expansion, the open end of the tubing 11 reflects the wave as a wave of rarefaction travelling back up the tubing, and creating a negative pressure peak at the head end 14 of the tubing at the instant of its arrival. This wave of rarefaction is in turn reflected by the head end 14 of the tubing as a wave of rarefaction travelling back along the tubing toward the open end 12 thereof. An inverse reflection again occurs at open end 12, so that a wave of compression now travels back up the tubing, to create a positive pressure peak at the instant of its arrival at head 14, all in accordance with well known quarter-wave pipe theory. If the engine 17 is so timed as to deliver another exhaust pulse in the pipe 18 at this same instant, i. e., each time a positive pressure pulse returns at substantially maximum amplitude to head 14 by travelling along the tubing 11, a reinforced pressure peak will be created at the head end 14 of the tubing, and the system will operate at resonance, with a pressure antinode established at P, and a velocity antinode established at V. According to this illustration, the four cycle engine 17 will be operated at a speed to assure delivery of exhaust pulses at the fundamental resonant frequency of the tubing 11. The tubing might also be resonated, however, by operating the engine at either a multiple, or a sub-multiple of the fundamental frequency. Moreover the engine 17 might equally well be a two cycle engine, it making no difference insofar as the present invention is concerned by what specific means the pressure pulses are delivered to the tubing 11, so long as they arrive at a resonant frequency of the tubing. If it is desired to make use of the second exhaust passage 20, the corresponding valve 23 may be timed to open before, after, or with the valve 21. The use of this valve 23, with its timing differing from that of valve 21, is more particularly described in my aforementioned application Serial No. 439,926.

Attention should be called to the fact that the described standing wave established in the tubing 11 assists in the performance of the cycle events of engine 17. Thus, the negative pressure half-cycle at zone P may partially overlap the scavenging stroke of engine 17, and thus aid in scavenging. Since the negative pressure half-cycle will overlap the intake stroke of the engine, again, by merely timing the exhaust valve 21 to remain open on into the intake stroke, this negative pressure, may be utilized to assist in drawing the fuel charge into the combustion chamber, and may even be utilized to open the valve 25, the cam 26 being assumed to be omitted. Finally, if the exhaust valve 21 remains open on into the compression stroke of engine 17 (or is omitted entirely), the rising positive pressure at zone P may assist initially in compressing the fuel charge within chamber 16.

It will be seen that exhaust gases are thus intermittently introduced to the tubing 11, and these will travel down the tubing, at a velocity which is, of course, much lower than the previously mentioned waves of compression and rarefaction, to be introduced into housing 13, and finally discharged via either or both of outlets 30 and 31. Thus, there is what may be described as a "direct current" flow of gases down the tubing 11. During alternate half-cycles of the standing wave in tubing 11, when the direction of flow is "up" the tubing, or to the left as viewed in Figure 1, fluid is drawn into the tubing 11 through its open end 12 from the housing 13, and during the remaining half-cycles this fluid is discharged from open end 12 back into housing 13, so that an "alternating current" flow of gases is superimposed on the previously described direct current gas flow. During the first mentioned half-cycles (flow toward the left), the valve 38 is opened by cam 39 and auxiliary fluid, preferably air, introduced by way of conduit 37. This introduced air may, of course, be introduced under pressure, but the virtue of the arrangement is that the velocity of gas flow within the tubing 11 creates a suction which draws or pumps the auxiliary air into and up the tubing 11.

The air so introduced via conduit 37 has a number of beneficial functions in the system of Figure 1. It acts first as a "flame holder" within the tubing 11. It should be explained that in the absence of the provisions of the present invention, flame from the combustion chamber may extend throughout the length of the tubing 11, and may even be projected through the outlets from the chamber 13. The air introduced via the conduit 37 rams the flame back up the tubing toward the closed head end thereof, and also furnishes sufficient additional oxygen to clean up and complete the combustion within a reasonably short distance from the head end region of the tubing. The tail end region of tubing 11, and the chamber 13, hence run at a cooler temperature, and the possibility of flame reaching the turbine 34 is avoided.

The air introduction by way of conduit 37 to the velocity anti-node region V, where substantial gas velocities are experienced, also creates a desirable turbulence which results in intimate mixing of the introduced oxygen with any remaining unburnt fuel, thereby further assuring completion of combustion.

It should be noted that by virtue of the velocity fluctuations at the region V resulting from the standing wave established in the tubing, a pumping effect is exerted upon the air introduced via the conduit 37. Thus, the system functions as an acoustic pump, energy from the combustion flame being successively transformed into acoustic wave energy, and thence into kinetic energy of flowing gas. An increased volumetric gas flow results, at reduced temperature, as is desirable for many purposes, including space heating. There are also advantages with particular reference to the turbine 34 fed by way of the outlet 31, but these can best be left for discussion in connection with later described specific turbine adaptations (Figures 6 and 7).

In the embodiment of Figure 2, the resonant tubing 40 has a flared open end 41, and has at its opposite end a head or closure 42, adjacent which is the combustion chamber region 58 of the system. A fuel intake passage 43 opens through this head 42, and is controlled by a suitable poppet valve 45 operated by cam 46 on cam shaft 47. The latter may be driven by any speed-governed drive means, such an electric motor, internal combustion engine, turbine, etc. Coupled to intake passage 43 is a supply pipe 48 to which the mixture is fed from a supercharger 49, the mixture being formed by a suitable carburetor 50. Cam shaft 47 may also drive the supercharger 49, as well as a magneto 51. As an alternative or supplementary fuel supply means, there may be provided a supplementary fuel injector pump 52 driven from cam 53 on cam shaft 47 and acting to meter a liquid fuel directly into the combustion chamber 58 via injector nozzle 59. The magneto 51 and cams on shaft 47 are, of course, arranged to provide the desired timing of fuel introduction and ignition (as by use of spark plug 54 connected to magneto 51).

Tubing 40 opens at its end 41 into enlarged housing or capacitance chamber 56, having discharge outlet 57, which in this instance is shown as valveless, and as directed straight rearwardly for jet propulsion purposes. The outlet 57 may, of course, be coupled to any conduit, accumulator, turbine, etc., and the apparatus in any such instance may be stationarily mounted.

Head 42 is shown provided with a second fluid passage 60, controlled by an inwardly opening spring-closed poppet valve 61, which is capable of opening automatically upon occurrence of a predetermined sub-atmospheric pressure within the head end or combustion region of tubing 40. The valve-controlled fluid passage 60 is connected by pipe 62, a capacitance chamber 63 and another pipe 64, with the capacitance chamber 56, the capacitance chamber 63 being used to render the interconnection between the chamber 56 and the combustion region non-resonating, i. e., non-sonic, at the operating frequency of the remainder of the apparatus, so as to prevent interference. The capacitance chamber 63 is provided with an air intake means, here shown in the form of a forwardly facing scoop 65, controlled by spring-loaded automatically opening intake valve 66, adapted to open upon predetermined suction within chamber 63 or upon pre-determined ram pressure in scoop 65. The system 62, 63 and 64 can be utilized to return gases from chamber 56 to combustion zone 58 in order to reduce negative pressure peaks in the latter on alternate half-cycles, and the valve controlled scoop 65 permits additional air introduction, all as explained in my aforesaid prior application Serial No. 439,926.

On the other hand, by either blocking valve 61 closed, using such a stiff spring that it will not open under negative pressure peaks in the combustion space 58 (or with the possible exception of only momentary opening at extreme negative peaks) or by eliminating the valve 61 and pipe 62 entirely, the scoop 65, chamber 63 and pipe 64 may be utilized to introduce secondary air to chamber 56 and thence to the velocity anti-node region V of tubing 40. For this purpose, the spring for valve 66 should be quite soft or light, so that the valve opens readily under the ram pressure that will exist within the scoop. The function of the valve in this case is simply to guard against any possibility of back flow. The opening of pipe 64 into chamber 56 is made near the tubing opening 41 so that the introduced air may be drawn into the opening 41 before it has the opportunity to be seriously diluted with the exhaust gases within chamber 55.

Operation of the system of Figure 2 is in general similar to that of Figure 1, with, however, certain differences owing to the location of the combustion chamber in the resonant tubing, and the elimination of the piston, as well as the valves between the combustion chamber and the gas column in the resonant tubing. Fuel introduced to the combustion chamber 58 is periodically exploded by a properly timed spark at plug 54, or by lingering flame from previous explosions, and positive pressure pulses (waves of condensation) are thereby launched down the tubing. These pressure pulses behave exactly as in Figure 1, each being reflected at open end 41 as a traveling negative pulse, which creates a negative pressure peak at combustion zone 58, and by reflection by the head 42, then travels back to open end 41, where it is reflected as a positive pulse traveling back to head 42. The latter creates a positive pressure peak at the combustion zone, and the engine is so timed with relation to the length of tubing 40 that an explosion occurs simultaneously with the attainment of this positive pressure peak. Accordingly, the gas column in the tubing is resonated, and a standing wave is created, with a pressure anti-node P at the closed head end of the tubing 40 and a velocity anti-node at the open end 41 thereof. The intake valve 45 is timed to open during the negative half-cycle at the zone P. During this negative pressure condition at P the pressure thereat will be less than the pressure developed by the supercharger, so that a combustible mixture will enter the zone P past the valve 45. Thereafter, the pressure in zone P builds up to positive peak value due to the resonance and standing wave pattern in the fluid column. As this pressure builds up, it compresses the fuel charge, and the ignition system functions to ignite the charge near the instant of maximum pressure to increase further the amplitude of the positive pressure pulse resulting at P from the standing wave. As already mentioned, according to one mode of operation, the valve 61 may open during the negative pressure half-cycle to admit additional air and/or gases returned from the chamber 56. On the other hand, in accordance with the principles of the present invention, the valve 61 may be substantially or entirely blocked, the spring loading of valve 66 made relatively light, and the air intake means 65 and pipe 64 utilized to furnish additional air to chamber 56 at a point therein such that said air may be periodically drawn into the velocity anti-node region V via open end 41 of tubing 40 and thus serve the same purpose as the air taken in through the conduit 37 in Figure 1.

Thus, excepting for the method of creating the pressure pulses at the head end of the sonic column within tubing 40, the system operates similarly to that of Figure 1. The capacitance chamber 56 will be noted to have a valveless discharge opening 57 directed straight rearwardly, such as may be used most effectively for jet propulsion purposes. On the other hand, outlets and uses such as shown and described in connection with Figure 1 are applicable to the system of Figure 2, and contrariwise, the valveless jet discharge outlet 57 of Figure 2 might be employed in the system of Figure 1.

Figure 3 shows a modification of Figure 2, and corresponding parts will accordingly be identified by corresponding reference characters, but with the suffix *a* used in each instance in the case of Figure 3. In Figure 3, the capacitance chamber 56a is shown as provided with a rearwardly directed jet discharge outlet 70, provided with spring-loaded discharge valve 71, and with lateral outlet 72 coupled to gas turbine 73 which discharges at 74. The turbine 73 drives a shaft 75 which in turn drives compressor or supercharger 76, and the latter is connected by pipe 77 to intake passage 43a. A carburetor may be used in connection with compressor 76 and pipe 77, if desired, but the fuel injection nozzle 59a will serve in Figure 3 as an illustrative fuel supply means. In Figure 3 the air intake passage 60a in head 42a connects to an air scoop 80, and the pipe 62 of Figure 2 is eliminated. Air introduction by way of passage 60a is hence made independent of members 63a to 66a, and the adjustment or operation of the spring-loaded valve 61a has no effect on the function of said members, whose only function is to take in secondary air and feed it to the velocity anti-node region V of tubing 40a.

The embodiment of Figure 3 shows how the turbine 73 may be used to drive the supercharger, and shows also how the members 63a to 66a may be made entirely independent of the valve 61a. Additionally, the turbine shaft 75 is indicated as driving a shaft 82 through a gear box 83, the shaft 82 being available for any desired purpose. Aside from these departures, the embodiment of Figure 3 operates in the fashion of Figure 2.

Reference is next directed to Figure 4, showing an adaptation of the invention to such a typical purpose as space heating. A resonant tubing 90, having an open end 91 and a head 92 closing its other end, is annularly spaced inside a large air duct 95, which is here shown as having a somewhat convergent section 96 just beyond the open end 91 of tubing 90. The left hand end of the duct 95 may be supplied with air in any desired manner, not shown, while the right hand end thereof may lead to any desired point of discharge.

The head end 92 of tubing 90 is equipped with a plurality of intake passages 93 controlled by spring-loaded inwardly opening poppet valves 94, adapted to open automatically upon development of a pressure depression inside the head end region of tubing 90. A bell-mouth 97 on the head end of tubing 90 receives air from the flow within duct 95 and directs it to intake passages 93, while a fuel supply pipe 98, which may supply any suitable powdered, liquid or gaseous fuel, discharges inside the bell mouth 97. A suitable mixture of primary air and combustible fuel is thus formed within the bellmouth 97, to be drawn in through the valve controlled passages 93. The valve springs are preferably tuned to a higher frequency than the resonant frequency of the tubing 90, and may readily be set into oscillation to pass fuel. For starting purposes, the pressure of the fuel jetted from pipe 98 will unseat the valves sufficiently to introduce a combustible fuel charge into the head end region of the tubing 90. This charge is ignited by spark plug 99 to initiate operation, and the spark plug may be used also during normal operation, but the combustion flame tends to linger in the head end region of the tubing 90 throughout the operating cycle, and will thereafter serve, after a finite ignition delay time interval, to ignite each successive charge admitted past the valves 94. To aid in holding this flame between explosions, an annular inwardly projecting flame holder or shroud 100 may be placed inside on the inner wall of tubing 90 near the head end thereof. The wave exciting combustion zone then becomes the space 101 between this shroud 100 and the head 92, and between explosions, an outside ring of attenuated-velocity flame remains in a position adjacent the wall of tubing 90 and in back of the annulus 100. As already stated, this is enough for subsequent combustion, which will occur when the compression has been raised to its positive peak by the usual standing wave, which as in the other cases has its pressure anti-node P at the combustion zone, and its velocity anti-node V at the open end 91. By constricting the tubing 90, the shroud 100 also serves to shield the intake valves from excessive heat radiation from afterburning down stream in tubing 90.

The combustion driven resonant tubing of Figure 4 will operate on a cycle which is like that of the tubing 40 of Figure 2, with the exception that fuel is admitted to the combustion zone past valves which open automatically in response to negative pressure at P. The air flow around the outside of tubing 90 in the duct 95 is directed by the deflector 110, which turns a portion of said flow radially inward immediately to the rear of the open end 91 of tubing 90, said air being thus supplied to the velocity anti-node region V of said tubing, and being drawn thereinto on alternate half-cycles (while the direction of velocity is toward the left), as in previously described embodiments. During the remaining half-cycles, this air is discharged from the tubing 90 along with products of combustion, to be carried away by the reduced duct 111. The outside air in duct 95 not thus turned in by deflector 110 passes through suitable apertures 112 in the supporting wall 113 for the deflector.

The duct air drawn into the tail end portion of tubing 90 and then expelled therefrom has the same advantageous uses in regard to holding the flame within the head end region of tubing 90, and completion of combustion, as have been already described in connection with the earlier embodiments. It will be appreciated that in addition, this outside duct air so mixed with the products of combustion from tubing 90, and so pumped along the duct by the acoustic pumping action of the standing wave in tubing 90, results in the production of a large mass flow of warmed air, suitable for space heating or similar purposes. Not only will the air sucked entirely into the open end of tubing 90 be heated, but eventually, by heat transferrence along the duct extension 111, all the air flowing along the duct will be warmed, including that passing through apertures 112. It should be understood that the air turned inwardly by the deflector 110 and sucked into and then expelled from the end of the tubing 90 will receive kinetic energy from the standing wave in said tubing, and, by aspiration, will transfer a portion of this energy to the surrounding air in the duct so that the overall effect on the total air flow in the duct 111 at a distance beyond the end of tubing 90 is both an increase in temperature, and an increase in velocity owing to the sonic pumping action of the standing wave. In many instances this "sonic-propelling" action is sufficient to cause all air flow required so that air intake to duct 95 may be at atmospheric pressure, with no blower needed.

In Figure 5 is shown a compressor-turbine combination utilizing a form of the present invention for several beneficial purposes. The compressor 120 and gas turbine 121 are axially arranged, the compressor being driven by turbine drive shaft 122, and the units 120 and 121 being axially spaced, as shown. Insofar as the present invention is concerned, the compressor and turbine may be of any suitable design, and typical details need not be disclosed herein. The compressor outlet has coupled to it one end of an air duct 124, the other end of which is coupled to the turbine intake, as indicated. Annularly spaced within duct 124 is a resonant, combustion-driven standing wave tubing 125, having open end 126 facing downstream in the duct, and into the head end 127 of which is connected a quarter-wave intake pipe 128 having air intake scoop 129 facing upstream in the duct. The quarter-wave intake pipe 128, which takes the place of the intake valves of the other embodiments, is more particularly described in my copending application Serial No. 728,766, filed February 15, 1947, entitled Jet Propulsion Apparatus. Suffice it to say here that it eliminates the necessity for valves, and supplies air at constant velocity without its presence substantially attenuating the standing wave in the tubing 125. Fuel (liquid, powdered, or gaseous) is introduced by way of fuel supply pipe 130 entering intake pipe 128, and ignition, at least for starting, is by means of spark plug 131. A baffle 132 is useful to retain the flame between explosions. As set forth in my aforesaid application Serial No. 728,766, such an apparatus will operate automatically at the resonant frequency of the quarter-wave tubing 125, with the establishment of a pressure anti-node P at the combustion zone, a velocity anti-node V at the open end of tubing 125, and a velocity anti-node V' at the intake end of pipe 128.

The compressor 120 will be understood to supply air under an elevated pressure to duct 124, wherein it flows around the outside of tubing 125, a portion thereof ending pipe 128 to operate the acoustic "burner jacket" unit 125. Operation of the latter is as usual, with intermittent combustion occurring at P at the resonant frequency of the quarter-wave tubing 125 so as to maintain the usual standing wave therein. A part of the air flowing along the outside of tubing 125 turns radially inward just beyond the end of the latter to enter its open end on every alternate half-cycle, to be subsequently expelled therefrom on the succeeding half-cycle, as will now be understood without repeating the reasons therefor. This air flow functions in the manner already described to ram and hold the flame back in the head end of the tubing 125, and to complete the combustion.

The temperatures reached in the combustion zone of tubing 125 are excessive for the turbine, and the auxiliary air that enters into the open tail of the tubing 125 aids in reducing the temperature of the gases to a permissible maximum. Because of the effective mixing of this auxiliary air with the products of combustion that results from the turbulent condition created at the velocity anti-node V, less auxiliary air is required for temperature reduction than would otherwise be necessary.

It is also important to recognize that the described acoustic pumping of air by the resonant combustion chamber 125 extracts additional work from the highly heated gases, thereby achieving a temperature reduction by direct transformation of heat energy into kinetic energy of flowing gases. The net overall result is that gases are supplied at the entrance to the turbine at increased pressure and reduced temperature. If, for example, the resonant combustion chamber 125 is capable of delivering gases at a pressure which is one and one-half times the pressure of the fuel and air supplied to its combustion zone, then the expansion ratio of the turbine may be one and one-half times the compression ratio of the compressor. In a gas turbine-compressor combination having a compressor with a four to one compression ratio, the resonant combustion chamber will serve to produce combustion gases at a pressure six times the intake pressure of the compressor, and the turbine may operate with an expansion ratio of approximately six to one. It may be stated that the assumed one to one and one-half compression ratio of the resonant combustion chamber is rather conservative; experiments indicate that a ratio of one to two may be easily practical.

It will be recognized that the resonant combustion chamber functions as a "topping unit," in that it derives useful work (gas pumping effect) from the highly heated gases while reducing the temperature of the gases to values that can be permitted within the turbine.

Such a turbine-compressor combination may be utilized in any appropriate power application; numeral 134 in Figure 5 indicates conventionally a power take-off means, which is simply representative of any suitable power take-off.

Figures 6 and 7 show another turbine-compressor combination utilizing a resonant combustion chamber in accordance with the invention. The compressor 140 and gas turbine 141 are again axially spaced, and provided with a common shaft 142. The compressor has its intake at 143, and there are a plurality of circumferentially spaced ducts 144 which connect compressor discharge ports 145 with a common turbine intake chamber (not shown) within the turbine 147. The turbine is shown as discharging at 147. Annularly spaced within each of ducts 144 is a resonant quarter-wave combustion-driven chamber or tubing 150, its open end facing downstream, and its closed end fitted with spark plug 151. A quarter-wave length air intake pipe 152 within the duct has an air scoop 153 facing upstream, and this pipe is shown in Figures 6 and 7 as having a tangential inlet to the head end region of the tubing 150. Figure 8 shows a modified intake pipe 152a which enters the tubing 150 radially, or at right angles.

Fuel is introduced into pipe 152 by means of pump 155 driven by shaft 142. Preferably, the intake pipes 152 for the several units 150 are fed by means of a single radial impulse-type pump 155 driven by shaft 142 and provided with a plurality of discharge outlets connected by fuel lines 156 to the several pipes 152. Pumps of this type, designed to deliver successive charges to their several outlets at intervals timed by the rotation of the drive shaft, are well known, for instance, in Diesel practice, and need not be detailed herein. By using such a pump, a polyphase relationship can be established between the wave patterns in the several burner units 150, so that, if enough such units are employed, the common intake chamber immediately ahead of the turbine will experience substantially constant pressure.

The operation of unit 150 is just like the corresponding unit 125 of Figure 5, and the description need not be repeated. The system of Figure 6 shows how a plurality of small units 150 can be used in parallel between a compressor and a gas turbine so as to achieve a substantially constant turbine intake pressure.

It has been explained how, with a quarter-wave jet propulsion apparatus having an open-ended tail through which products of combustion are jetted, air is drawn into and expelled from this open tail in step with reversing gas velocities occurring thereat. With high forward velocities of the apparatus, the quantity of air that can be aspirated into the tail is reduced markedly by the slip-stream effect. Thus the apparatus tends to become starved for lack of air on which to work, and a serious self-imposed limitation is thereby imposed on forward velocity.

The difficulty mentioned in the previous paragraph is helped by the apparatus of Figure 9 which shows a modification applicable to either of Figures 1 and 2. The resonant tubing 40b (which may have a head end as in either Figure 1 or Figure 2) has its flared open end 41b discharging inside a bowl-like member 85 fitted therearound and having in this instance a wide mouth 86 which discharges to atmosphere in a rearward direction. A plurality of air intake pipes are fitted into member 85, two alternative types of such pipes being shown. The first, indicated at 64b, is just like the pipe 64a of Fig. 3, having capacitance chamber 63b and air scoop 65a, but the valve controlling the latter has been removed. The other intake pipe 88 has simply a forwardly facing air scoop 89 at its forward end. These pipes 64b and 88 open into member 85 where the air introduced therethrough will be directed to the velocity anti-node region V within the tubing 40b. Additional air so fed to the velocity anti-node region of the resonant tubing by pipes such as 64b and 88 will supply its requirements notwithstanding high forward velocities of the apparatus.

Figure 10:
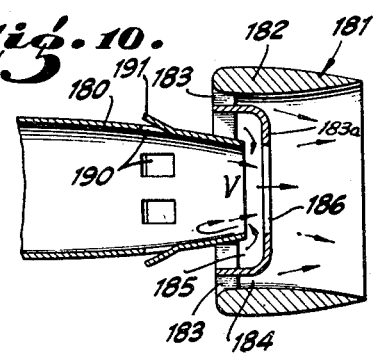
Figure 10 is a fragmentary longitudinal sectional view of a resonant conduit with a thrust augmenter mounted thereon.

Figure 10 shows a fragmentary rearward portion of a resonant combustion-driven tubing 180 of an apparatus such as any of those described herein. Assuming a jet propulsion adaptation this tubing may be assumed to be intended for flight through the atmosphere. To augment the required radially inward and then reverse flow of air into the open tail, a thrust augmenter 181 is used on the tail. This thrust augmenter comprises an air directing or conveying means designed to intercept air from the surrounding slip stream and introduce it into the tail of the tubing. As here shown, this air directing means comprises an annulus 182 which is of modified airfoil Venturi contour in longitudinal section. This annulus surrounds the rearward extremity of tubing 180, and is annularly spaced therefrom as shown, being mounted on the shell by means of radial supports 183. An annular baffle 183a carried by supports 183 divides the annular space between the tubing 180 and annulus 182 into outer and inner regions 184 and 185, respectively. It will be understood that the jet discharge from the tail through annulus 182 creates a suction at the entrance to these two regions 184 and 185. Air thereby drawn into region 184 between annulus 182 and baffle 183a is added to and augments the mass of the propulsive jet directly. That air which is drawn into the inner region 185 is directed radially inward by an inwardly curved portion 186 of baffle 183a, to be influenced by the air flow conditions prevailing at the velocity anti-node V located at the discharge opening in the tail. Thus, as in the earlier described embodiments, outside air is sucked into the tail during reverse-flow half-cycles, to be jetted out along with products of combustion during the alternate half-cycles. The augmenter thus augments the supply of outside air to the velocity anti-node region V of the apparatus. It will also be evident that such a device as shown in Figure 10 may be used to advantage on the resonant tubings or "burner jackets" of the types of apparatus shown in Figs. 4, 5, and 6.

As a further measure to the same end, air intake ports 190 are preferably formed in tubing 180 near the rearward end thereof, being covered over by air scoop means 191 adapted to catch boundary layer air and deflect same in through the ports 190.

Figure 11:
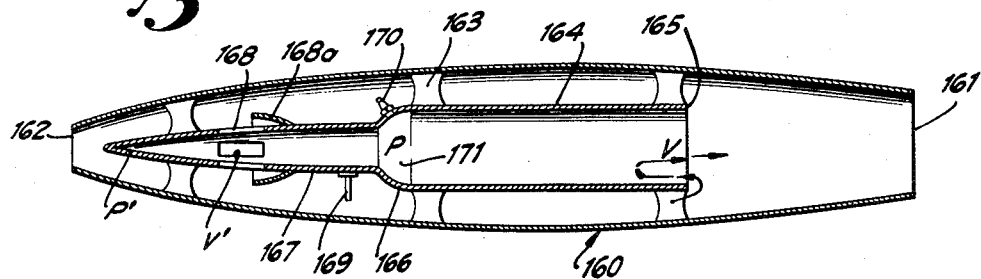
Figure 11 is a longitudinal sectional view of a jet propulsion apparatus in accordance with the invention.

Figure 11 shows a jet propulsion apparatus in accordance with the invention utilizing a ram-jet around the burner jacket to envelop it is a super-atmosphere and to supply additional air to the open tail of the burner jacket. Numeral 160 designates generally an elongated streamlined shell, preferably of circular section, having its greatest thickness a little rearward of its mid-section, and being slightly convergent toward its open tail end 161, and somewhat more convergent toward its open forward end or nose 162.

Mounted on spacers 163 at an annular spacing inside shell 160 is a quarter-wave combustion chamber or tubing 164 having open end 165 facing down stream, and head end 166 fitted with half-wave length air intake pipe 167 closed at its forward end but having air intake ports 168 mid-way of its length. For a description of such a half-wave length intake pipe see my aforesaid copending application Serial No. 728,766. Fuel is introduced to pipe 166 via fuel line 169, and may be metered by a suitably driven fuel pump, not shown. Ignition, at least for starting, is provided by spark plug 170.

Assuming a forward velocity, air entering the open nose 162 flows rearwardly around the half-wave pipe 166 and the resonant tubing 164, and finally discharges from the open rear end 161.

Owing to the expanding cross-section of the shell 160 from its nose 162 rearward, the velocity of the air flow within the expanding portion of the shell decreases and its pressure increases, as in a "ram-jet," in accordance with Bernoulli's law. In this connection, it should be noted that the expansion of the shell should be sufficient to more than offset the fraction of the cross-sectional area occupied by the tubing 164 and its intake pipe 166, so that a "super-atmosphere," or super atmospheric pressure, exists all around the tubing 164 and its intake pipe. It follows that the unit 164 will operate at an elevated mean pressure, which results, among other things, in a standing wave of increased Q, as discussed in my aforesaid application Serial No. 439,926.

Thus the air flow around air intake pipe 166 is at super-atmospheric pressure by the time it reaches intake ports 168. Air is deflected in through these ports by scoops or lips 168a, and thence flows to and through the resonant tubing 164. The operation of the tubing 164 is like that of the units already described, fuel from line 169 being intermittently exploded at combustion chamber region 171 at the resonant frequency of the tubing 164. The length of tubing 164 is substantially a quarter-wave length measured in the hot gases traversing that tubing. The air intake pipe, closed at its forward end, is substantially a half-wave length measured in the cold air traversing it. The theory of such a half-wave air intake pipe is adequately set forth in my aforesaid copending application Serial No. 728,766; suffice it to say herein that the pipe 166 supplies air at substantially constant velocity to the combustion zone 171, and that, in operation, not only are pressure and velocity anti-nodes P and V created respectively at the combustion zone 171 and at the open end of the tubing 164, but a velocity anti-node $V^1$ appears in intake pipe 166 at intake ports 168, and a pressure anti-node $P^1$ appears at the closed forward end of the intake pipe. Positive pressure peaks at zone 171 compress the fuel charge, and ignition, by spark plug 170, or by flame lingering after the preceding explosion, causes an explosive gaseous expansion which operates as in earlier described embodiments. It will of course be understood that the ignition system (not shown) connected to the spark plug, and the fuel metering means are properly timed to the fundamental frequency of the tubing 164 in order to resonate the apparatus and create the standing wave. However, the system will automatically time itself when no ignition means other than lingering flame is utilized, and the fuel is fed at constant velocity. In such case, the standing wave created in the tubing 160 will automatically control the events of the cycle.

The shell 160 supplies air at super-atmospheric pressure to the open tail of the resonant tubing 164, with the several previously described beneficial effects to the operation of the latter. The lowered velocity of the air flow around the tubing 164, as compared with air velocity outside the shell 160, results in an augmented secondary air supply to the velocity anti-node region V of tubing 164, which in turn means improvements in flame holding, mixing, completion of combustion, and rearward jetting from the tail of tubing 164. The latter effect, in turn, means additional pumping or propelling effect on the fluid flow through the shell, and hence increased velocity of jet discharge from the tail of shell 160. Increase in jet discharge velocity results of course in increased intake velocity at nose 162, and the overall effect is augmented power of the entire apparatus. It is to be understood that the form of shell 160 is subject to modification; for example, it may be formed as a super-sonic diffuser, permitting super-sonic velocities.

With reference to the use of an acoustic burner in a ram-jet, it should be recognized that any conduit having definite discontinuities will necessarily have a resonant frequency pattern of its own. Therefore the conduit or shell 160 associated with the acoustic burner tube 164 will tend to become part of the resonant system because of mutual coupling. It is correspondingly advisable to select dimensions of the apparatus so that the acoustic burner and the conduit for the secondary air will be mutually cooperative and will not tend to "spoil" or destroy resonance in the acoustic burner. Referring specifically to Fig. 11, I have found that there is a definite degree of acoustic coupling with the main air conduit 160 at all openings in the acoustic burner 164. Therefore the relative dimensions of the two wave guides 160 and 164 should be such that the necessary impedance and phase relationships are maintained at these openings in the acoustic burner to allow its resonating with maximum amplitude. As an example, I find it advisable that the acoustic burner 164 be located in the main conduit 160 in a position that will not cause the discharge or low impedance end of member 164 to be at any region of high acoustic impedance which might exist in main conduit 160.

I claim:

1. A standing wave jet discharge heat engine which includes: a resonant housing defining and containing a fluid column in which may be established a sonic standing wave, having velocity and pressure anti-nodes, means for causing an intermittent combustion of fuel and air at the resonant frequency of said column at said pressure anti-node to create and maintain said standing wave, and a fluid duct arranged and directed to introduce air to said fluid column in the region of said velocity anti-node, said housing being provided with a wave expanding jet discharge fluid outlet leading from said velocity anti-node region of said fluid column.

2. A standing wave jet discharge heat engine which includes: a resonant housing defining and containing a column of fluid adapted to have a standing wave established therein, said housing having therein pressure wave reflecting means located at one end of said column, and including pressure wave expanding means terminating the other end of said column, pressure disturbance means in pressure transmitting relationship with said fluid column operative at the resonant frequency of the fluid column, said reflecting means establishing a pressure anti-node of said standing wave adjacent said one end of said fluid column, and said wave expanding means establishing a velocity anti-node of said standing wave substantially nearer to said other end of said column than to said one end, a fluid duct arranged and directed to introduce fluid to said velocity anti-node region of said fluid column, and said housing having a jet discharge fluid outlet through which fluid is propelled by said standing wave.

3. A standing wave jet discharge heat engine which includes: a housing defining and containing a column of fluid adapted to have a standing wave established therein, said housing having therein pressure wave reflecting means at one end of said column, and having a fluid opening at the end remote from said wave-reflecting means through which fluid may be alternately taken in and jet-expelled, pressure disturbance means in pressure transmitting relationship with said fluid column operative at the resonant frequency of the fluid column to establish a standing wave therein with a pressure anti-node thereof adjacent said reflecting means, and with a velocity anti-node nearer to said end of said column that is remote from said wave reflecting means, said standing wave operating alternately to take fluid into and expel fluid from said fluid opening, and a fluid duct arranged and directed to introduce fluid to the velocity anti-node region of said fluid column.

4. The subject matter of claim 3, wherein said fluid duct comprises a fluid conduit surrounding said housing and supplying fluid for intermittent aspiration into said housing through said fluid opening.

5. The subject matter of claim 3, wherein said fluid duct comprises a pipe opening into said housing in the velocity anti-node region thereof.

6. The subject matter of claim 3, wherein said fluid duct comprises a valve-controlled pipe opening into said housing in the velocity anti-node region thereof.

7. The subject matter of claim 3, wherein said fluid duct comprises a fluid flow conveying means for directing fluid to a region in immediate proximity to said fluid opening whereby said fluid can be aspirated into the housing by way of said opening.

8. A standing wave jet discharge heat engine, which includes: a resonant housing defining and containing a column of fluid adapted to have a standing wave established therein, said housing having therein pressure wave reflecting means at one end of said column establishing a pressure anti-node of said standing wave thereadjacent, and having a fluid opening at the other end thereof for intake and jet discharge of fluid, said opening establishing a velocity anti-node of said standing wave thereadjacent, fuel combustion means operative at the resonant frequency of said fluid column arranged to supply expanding products of combustion at the region of said pressure anti-node and thereby create intermittent standing-wave-sustaining pressure pulses at said region, and an air duct for conveying auxiliary air to the region of said velocity anti-node in said fluid column.

9. The subject matter of claim 8, wherein said air duct comprises a conduit surrounding and spaced from said housing and carrying airflow between it and the housing which is available for intermittent aspiration into said housing through said fluid opening in said housing.

10. The subject matter of claim 8, wherein said air duct comprises a conduit surrounding and spaced from said housing and carrying airflow between it and the housing which is available for intermittent aspiration into said housing through said fluid opening in said housing, said conduit also serving to convey away airflow not thus drawn into the housing, as well as products of combustion discharged from said housing by way of its said fluid opening.

11. The subject matter of claim 8, wherein said air duct comprises a pipe opening into said housing in the vicinity of the velocity anti-node region thereof.

12. The subject matter of claim 8, wherein said air duct comprises a pipe adapted to be supplied with air under pressure and arranged to discharge in the vicinity of the velocity anti-node region of said housing.

13. The subject matter of claim 8, wherein said air duct comprises a pipe adapted to be supplied with air under pressure and arranged to discharge in the immediate vicinity of said fluid opening in said housing.

14. A standing wave jet discharge heat engine, which includes: a tubular resonant housing having a closed end and an open end, said housing being adapted to contain a fluid column in which a standing wave can be sustained, with a pressure anti-node adjacent said closed end and a velocity anti-node adjacent said open end, fuel combustion means operative at the resonant frequency of said fluid column arranged to discharge expanding products of combustion at the region of said pressure anti-node and thereby create intermittent standing-wave-sustaining pressure pulses at said region, an enlarged chamber on the open end of said tubular housing, a jet discharge fluid outlet opening leading from said chamber, and an air duct arranged to convey and direct auxiliary air to the velocity anti-node region of said housing.

15. A standing wave jet discharge heat engine, which includes: a tubular resonant housing having a closed end and an open end for jet discharge of fluid, said housing being adapted to contain a fluid column in which a standing wave can be sustained with a pressure anti-node adjacent said closed end and a velocity anti-node adjacent said open end, fuel combustion means operative at the resonant frequency of said fluid column arranged to discharge expanding products of combustion at the region of said pressure anti-node and thereby create intermittent standing-wave-sustaining pressure pulses at said region, and means associated with the open end of said housing for directing outside air radially inward into the region immediately to the rear of said open end of said housing.

16. In a compressor-turbine combination, the combination of: an air duct connected between the discharge of the compressor and the intake of the turbine of said combination, a resonant burner housing spaced inside said air duct, containing a fluid column which extends in the direction of the air duct, said housing having a sound wave reflector at the upstream end of said column and an open end at the downstream end thereof, all in such manner that a standing wave may be created in said fluid column, with a pressure anti-node in the region of the reflector, and a velocity anti-node in the region of said open end and fuel combustion means operative at the resonant frequency of said fluid column arranged to supply expanding products of combustion within said burner housing at the region of said pressure anti-node and thereby create intermittent standing-wave sustaining pressure pulses at said region, said air duct supplying auxiliary air to the velocity anti-node region adjacent said open end of said burner housing.

17. A jet propulsion apparatus which includes: a ram-jet housing having an air intake opening in its nose and a gas discharge opening at its tail, said housing forming a fluid duct between said openings, a resonant burner housing spaced inside said housing, so as to permit fluid flow past the discharge end at said burner, said housing containing a fluid column which extends in the direction of said fluid duct, and having a sound wave reflector at the upstream end of said column and an open end at the downstream end thereof, all in such manner that a standing wave may be created in said fluid column, with a pressure anti-node in the region of said reflector, and a velocity anti-node in the region of said open end, and fuel combustion means operative at the resonant frequency of said fluid column arranged to supply expanding products of combustion within said burner housing at the region of said pressure anti-node and thereby create intermittent standing-wave-sustaining pressure pulses at said region, said fluid duct supplying auxiliary air to the velocity anti-node region adjacent said open end of said burner housing.

ALBERT G. BODINE, JR.

REFERENCES CITED

The following references are of record in the file of this patent:

FOREIGN PATENTS

| Number | Country | Date |
|--------|---------|------|
| 1,652 | Great Britain | Jan. 22, 1906 |
| 188,642 | Great Britain | Nov. 29, 1923 |